United States Patent [19]

Kerley et al.

[11] Patent Number: 4,580,336

[45] Date of Patent: Apr. 8, 1986

[54] APPARATUS FOR SLITTING AMORPHOUS METAL AND METHOD OF PRODUCING A MAGNETIC CORE THEREFROM

[75] Inventors: Barry W. Kerley; James W. Morton; Bruce R. Watson, all of Hickory, N.C.

[73] Assignee: General Electric Company, King of Prussia, Pa.

[21] Appl. No.: 574,234

[22] Filed: Jan. 26, 1984

[51] Int. Cl.[4] ........................ C03B 33/02; H02K 15/04

[52] U.S. Cl. ........................ 29/605; 29/33 S; 72/129; 225/2

[58] Field of Search ........................ 29/335, 605, 609; 72/129, 130, 177, 203, 379; 225/2, 3, 94, 96, 100, 96, 5, 93

[56] References Cited

U.S. PATENT DOCUMENTS

| | | | |
|---|---|---|---|
| 2,314,912 | 3/1943 | Troy | 175/356 |
| 3,981,422 | 9/1976 | Moore | 225/2 |
| 4,018,372 | 4/1977 | Insolio | 225/2 |
| 4,320,645 | 3/1982 | Stanley | 29/605 X |
| 4,356,377 | 10/1982 | Norton et al. | 219/121 |

FOREIGN PATENT DOCUMENTS

| | | | |
|---|---|---|---|
| 3207934 | 12/1982 | Fed. Rep. of Germany | 225/94 |
| 820951 | 4/1981 | U.S.S.R. | 72/129 |

OTHER PUBLICATIONS

J. M. C. Li, Chapter 9, pp. 224–246, of the book "Metallic Glasses", published in 1978 by the American Society for Metals, Metals Park, Ohio.

*Primary Examiner*—Howard N. Goldberg
*Assistant Examiner*—Timothy V. Eley
*Attorney, Agent, or Firm*—William Freedman

[57] ABSTRACT

A slitting apparatus for an amorphous metal strip employs a scribing tool to form a scribed line in a surface of the strip as it is transported past the scribing tool. The scribed strip is folded toward the scribed line and creased between mandrels. Then the crease is flattened out against a flattening surface, whereupon the strip cleanly separates into first and second strips. A separating device downstream of the flattening surface moves the newly separated edges apart. A functional relationship between at least some of the radius of the cutting edge of the scribing tool, the scribing force, the tension in the strip and the separating device is described and empirical methods for maintaining these elements with effective operating ranges are given.

41 Claims, 24 Drawing Figures

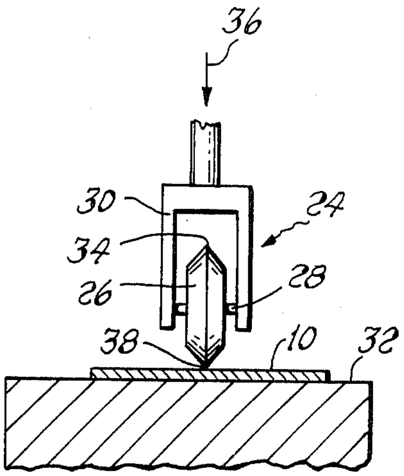
Fig. 5
Fig. 6
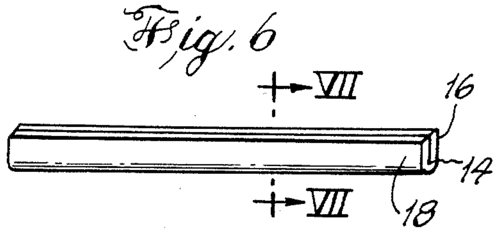
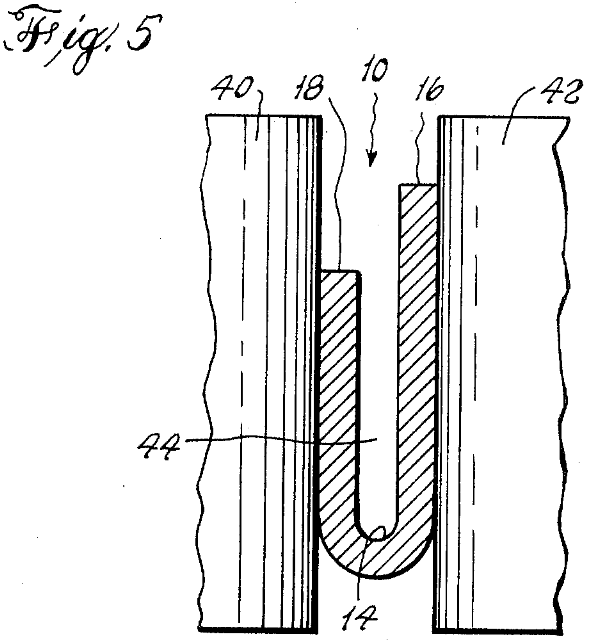
Fig. 7
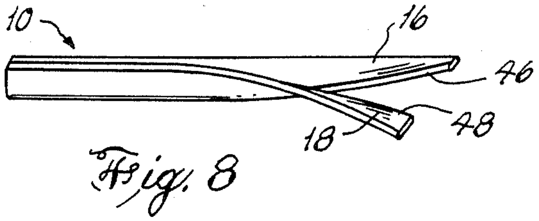
Fig. 8

APPARATUS FOR SLITTING AMORPHOUS METAL AND METHOD OF PRODUCING A MAGNETIC CORE THEREFROM

BACKGROUND

The present invention relates to amorphous metals and, more particularly, to an apparatus and method for slitting an amorphous metal foil.

The invention herein disclosed is based on research sponsored in part by the Electric Power Research Institute, Palo Alto, Calif.

The basic principles upon which the slitting apparatus and method of the invention rely are described in copending U.S. patent application Ser. No. 574,233 filed on the same date as the present application. To the extent necessary for full disclosure of the present invention, the pertinent parts of the copending application are repeated herein.

Amorphous metals are metal alloys in which the usual crystalline structure is not present. A resume of amorphous metal materials and their properties is contained in a paper entitled *METALLIC GLASSES: A MAGNETIC ALTERNATIVE,* by Donald Raskin and Lance A. Davis, published in IEEE Spectrum, November 1981, the contents of which are herein incorporated by reference. In brief, an amorphous metal is formed by cooling a molten alloy at such a high rate (typically exceeding a million degrees per second) that the usual crystalline structure of the metal does not have time to form. Instead, the metal is frozen into a metastable condition in which the disorder of the molten form is preserved.

Amorphous metals exhibit a number of differences in their properties from the normal crystalline form of the same alloy which make them especially suitable for certain applications. They are harder, more abrasive and more sensitive to mechanical stresses, have higher mechanical strength, flexibility and electrical resistivity than their crystalline forms and some alloys of amorphous metal exhibit the softest magnetic characteristics of any known materials. This latter property is especially desirable for magnetic core materials since the ease with which a magnetic material is magnetized and demagnetized controls the hysteresis losses experienced when the magnetic material is repetitively magnetized first in one direction and then in the other direction as is customarily the case for magnetic core materials in AC machinery.

An AC distribution transformer, for example, has its primary winding permanently connected to the AC line. Thus, the primary winding continuously cycles the transformer core between extremes of magnetic intensity. The repetitive traversing of the hysteresis loop of the transformer core produces hysteresis losses which must be made up by primary power. These hysteresis losses represent an overhead cost of operating the transformer which is independent of load. Even during periods of light or zero secondary loading, power must be fed to the primary to supply the hysteresis losses in the transformer core. Substitution of a suitable amorphous metal for the magnetic steel normally used in transformer cores can reduce this hysteresis overhead by a factor of 10 or more.

Amorphous metals also have characteristics which have heretofore interfered with their use. One of the problems arises because the need for an extremely rapid cooling rate during the casting of a strip of amorphous metal dictates that the amorphous metal strip must be extremely thin. Thicknesses of about 0.076 mm. inches are about the maximum which can be produced, with more typical values on the order of from about 0.025 to about 0.050 mm. inches. Normal transformer core laminations are about ten times thicker. Thus, about ten times as many layers of amorphous metal are required to form a transformer core of the same cross section as are required with the steel laminations of the prior art.

Space factor is important in many magnetic cores. Space factor is defined as the ratio of the actual volume of core material to the physical volume consumed by the core. If the layers making up the core do not lie flat upon each other but instead remain separated by air or other non-magnetic material, the physical volume consumed by the core increases without a corresponding increase in magnetic properties. If burrs or irregularities are present on the edges of the core laminations, the laminations do not lie flat and consequently the space factor is degraded. The thinness dictated by the way amorphous metals are made adds to the problem. For example, burrs which are small enough to be ignored on the edges of conventional core laminations may cause severe degradation in the space factor when ten or more times as many layers are used.

Amorphous materials are so hard and abrasive that it is extremely difficult to cut the as-cast strip into the sizes and shapes needed to form a core. Conventional cutting techniques include, for example, slitting with wheel-type slitting devices, scissors-type cutters and punch-type cutters, all of which rely on sharp cutting edges for clean cuts. The required sharp cutting edges of these devices rapidly degrade due to the hard abrasive material being cut, even when the cutting edges are made of hard material such as, for example, tungsten carbide. Wheel-type slitting devices also suffer from the thinness of the amorphous metal strip. That is, if the amorphous metal strip is, for example, about 0.0015 inches thick, then the cutting wheels must be set for a clearance on the order of 0.005 inches or less. Such tolerances call for the best, and most expensive, attainable tolerances and, even when such tolerances are attained, the cutting must be performed under controlled temperature conditions. When the cutting edges wear, they begin to produce kerfs or burrs which prevent successive layers of a core from laying in complete contact with each other and thus result in degraded space factor.

U.S. Pat. Nos. 4,328,411 and 4,356,377 disclose laser and/or electron beam cutting techniques for forming complex shapes by either melting and cutting completely or partially through an amorphous strip or heating it above its crystallization temperature so that the desired cutting line assumes the brittle crystalline form of the alloy which can thereafter be easily broken to separate the desired shape from the remainder of the strip. Although these techniques avoid the degradation in edge quality resulting from worn cutting edges of cutting tools, they still produce reduced space factor due to edge burrs. In addition, the heating that these techniques produce along the cutting line leaves crystallized alloy with a resulting loss in the very magnetic properties in these areas which use of the amorphous material is intended to provide.

Conventional casting techniques are capable of producing amorphous alloy strips in continuous lengths up to several miles long which are long enough to form the entire core of a transformer or other electrical apparatus. In order to utilize such material, extended lengths of the strip must be slit in a continuous process.

Transformer cores may be formed in a toroidal shape or in the shape of a deformed toroid which approximates a rectangular exterior outline by winding a continuous length of amorphous metal strip about a suitably shaped mandrel. Such cores are subsequently wound with primary and secondary windings to complete the electrical functions of the apparatus. It is desirable to systematically vary the width of the amorphous alloy strip from end to end so that the cross section of a core formed from the strip assumes a shape which conforms to the shape of the winding to be placed on it. Preferred cross-sectional shapes for use in transformer cores include, for example, approximations of circles or regular polygons.

OBJECTS AND SUMMARY

An object of the invention is to provide an apparatus and method for cutting strips of brittle and very hard iron-based amorphous alloy that is characterized by clean, burr-free edges without the production of crystallized alloy at the edges.

Another object of the invention is to provide a method for cutting strips of amorphous metal which takes advantage of the characteristics of the amorphous metal itself to produce the cut.

A further object of the invention is to provide a method for cutting strips of amorphous metal of unlimited length.

A still further object of the invention is to provide a method for cutting a strip of amorphous metal into two strips along a cutting line which is defined by a scribe line on the strip.

A yet further object of the invention is to provide a method for cutting a strip of amorphous metal into two strips along a substantially straight line of indefinite length without requiring special environmental control.

According to an embodiment of the invention there is provided apparatus for slitting a strip of amorphous metal comprising means for scribing a line in a first surface of the strip, means for folding the parts of the strip on opposite sides of said scribed line toward each other along the line to form a folded strip having the line within the fold, means for moving said parts during folding into near face-to-face contact and sufficiently close together adjacent the line to form a crease, and means for at least partly flattening the crease whereby the strip separates into first and second strips on opposed sides of the line.

According to a feature of the invention there is provided apparatus for slitting a strip of amorphous metal comprising means for transporting the strip in a direction, the means for transporting including means for producing a predetermined tension in the strip, a wheel-type scribing tool of the type including a wheel having a cutting edge thereon, the cutting edge including a cutting edge radius, means for contacting the cutting edge on a first surface of the strip of amorphous metal, a backup surface contacting a second surface of the strip opposing the wheel-type scribing tool, the means for contacting being effective for applying a predetermined scribing force to the cutting edge, the cutting edge radius and the predetermined force being jointly effective for scribing a scribe line in the surface as the strip is transported therepast, first and second mandrels having first and second facing surfaces spaced a first predetermined distance apart and disposed a second predetermined distance downstream of the wheel-type scribing tool, the second predetermined distance being effective to permit the strip to fold about the scribed line for entry between the first and second facing surfaces and the first predetermined distance being effective to crease the strip about the scribed line, a flattening surface downstream of the first and second mandrels, the flattening surface being disposed for contacting the second surface of the strip, the predetermined tension being effective for flattening the crease against the flattening surface, means downstream of the flattening surface for separating newly separated edges of the strip and at least some of the cutting edge radius, the predetermined scribing force, the first predetermined distance, the predetermined tension and the means for separating being jointly effective for producing a slit in the strip as it leaves the flattening surface.

According to a further feature of the invention there is provided a method for producing a magnetic core comprising scribing a line in a first surface of a strip of amorphous metal, folding the parts of said strip on opposite sides of said scribed line toward each other along the line to form a folded strip having the line within the fold, moving said parts sides sufficiently close together adjacent the line to form a crease and least partly flattening the crease whereby the strip separates into first and second strips on opposed sides of the line and winding at least one of the first and second strips to form the magnetic core.

Briefly stated, the present invention provides a slitting apparatus for an amorphous metal strip which employs a scribing tool to form a scribed line in a surface of the strip as it is transported past the scribing tool. The scribed strip is folded toward the scribed line and creased between mandrels. Then the crease is flattened out against a flattening surface, whereupon the strip cleanly separates into first and second strips. A separating device downstream of the flattening surface moves the newly separated edges apart. A functional relationship between at least some of the radius of the cutting edge of the scribing tool, the scribing force, the tension in the strip and the separating device is described and empirical methods for maintaining these elements within effective operating ranges are given.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 5 is a cross section of an amorphous strip and a back-up surface showing one type of scribing tool which may be employed in the practice of the invention.

FIG. 6 is a perspective view of a folded and creased strip of amorphous alloy.

FIG. 7 is a cross section taken along VII—VII of FIG. 6 and showing a pair of opposed mandrels for creasing the strip.

FIG. 8 is a perspective view showing the flattening and separating parts of the method in progress.

DETAILED DESCRIPTION OF THE PREFERRED EMBODIMENT

Figure 1:
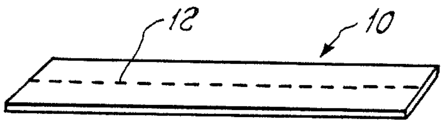
FIG. 1 is a perspective view of a strip of amorphous metal to be separated into two strips along a substantially straight line.

Referring now to FIG. 1, there is shown, generally at 10, a strip of amorphous metal alloy 10. Although the present invention should not be considered to be limited to a particular alloy, for concreteness of description, one alloy with which the method of the invention has been used, and which is employed as an exemplary material upon which the following description is based, is identified as alloy 2605 S-2 manufactured by Allied Corp., and consisting of about 78 percent iron, 13 percent boron and 9 percent silicon. Use of the method disclosed herein with other suitable amorphous metal alloys should also be considered within the spirit and scope of the present invention. Strip of amorphous metal alloy 10 may be as long as convenient and may have a width as wide as can be cast using known or to-be-developed manufacturing techniques. A desired cutting line 12 is indicated in dashed line. Although cutting line 12 is shown to be straight and aligned with the length dimension of strip of amorphous metal alloy 10, a substantial curvature may be accommodated in cutting line 12 and the method of the present invention is successfully performed irrespective of the angle of cutting line 12 with respect to the length dimension of strip of amorphous metal alloy 10. That is, cutting line 12 may be oriented parallel to the length dimension as shown, normal to the length dimension, or at any angle in between.

Figure 2:
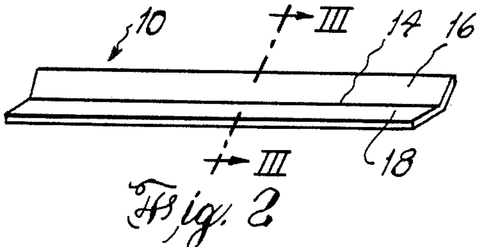
FIG. 2 is a perspective view of the strip of amorphous alloy of FIG. 1 after receiving a scribed line in one surface thereof.
Figure 3:
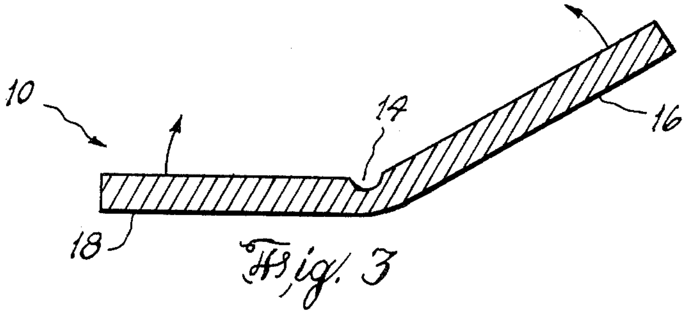
FIG. 3 is a cross section taken along III—III of FIG. 2.

Referring now to FIG. 2, a scribe line 14 is formed along the line previously defined by cutting line 12. Scribe line 14 divides strip of amorphous metal alloy 10 into first and second parts 16 and 18 which typically fold slightly toward each other about scribe line 14. Referring now also to the cross section in FIG. 3, scribe line 14 forms a depression in strip of amorphous metal alloy 10. If strip of amorphous metal alloy 10 were of normal crystalline material, the formation of scribe line 14 would deform the material of the strip by pressing it to the sides and upward along scribe line 14 to form parallel linear mounds or berms. Such mounds or berms, if they existed, would degrade space factor. As shown in FIG. 3, however, the edges of scribe line 14 do not exhibit more than insignificant mounds, but instead, are substantially flat and parallel to the surfaces of part 16 and part 18.

Figure 4:
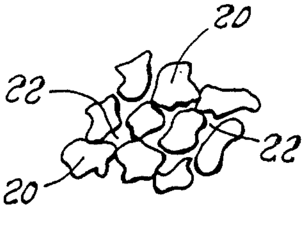
FIG. 4 is a microscopic view of the amorphous alloy material.

Although we do not intend that the method of the present invention should be limited to any particular causal theory, we presently believe that the way in which the structure of strip of amorphous metal alloy 10 differs from the normal crystalline form of the alloy accounts for the form of scribe line 14 shown in FIG. 3. When a normal crystalline form of an alloy solidifies, the crystals thus formed reorient themselves as necessary to produce a substantially solid piece of metal with few, if any, voids. Conversely, when the alloy is rapidly cooled to form strip of amorphous metal alloy 10, instead of having time to rearrange itself to produce a solid, the alloy is trapped in a metastable amorphous state consisting of alloy particles such as shown at 20 in FIG. 4 with a percentage of the volume consisting of voids 22 distributed throughout the mass of the material. The sizes of particles 20 and voids 22 are, in fact, on the atomic scale but are exaggerated in FIG. 4 for purposes of explanation. When scribe line 14 is formed, voids 22 may be displaced laterally away from scribe line 14. This displacement may nucleate cracks on the side of strip of amorphous metal alloy 10 opposite to the side being contacted by the tool forming scribe line 14 in the regions alongside scribe line 14 to which voids 22 are displaced. This permits the formation of scribe line 14 without displacing material to the sides and upward. The resulting line of nucleated cracks alongside scribe line 14 do not propagate into the surrounding material on their own, but instead, must await a certain type of tensile stress to mature and permit separation of the material along scribe line 14.

Scribe line 14 may be formed by any convenient tool such as an awl, a knife edge and the like. Even though the material of strip of amorphous metal alloy 10 is hard and abrasive, the fact that scribe line 14 does not have to penetrate strip of amorphous metal alloy 10, but only contact and press against its surface, substantially reduces tool wear as compared to a cutting method where penetration of the strip exposes the cutting tool to cut edges of the strip. We have found that a wheel-type cutter of a type similar to a glass cutter, such as shown at 24 in FIG. 5, is particularly effective for forming scribe line 14. A wheel 26 is rotatably supported on an axle 28 between legs of a yoke 30. A back-up surface 32 supports strip of amorphous metal alloy 10 which is contacted by a cutting edge 34 of wheel 26 to produce scribe line 14. In order to produce a clean scribe line 14, back-up surface 32 is preferably hard, unyielding and flat. In the preferred embodiment, back-up surface 32 is hard steel. A downward force, indicated by an arrow 36 urges yoke 30 into contact with strip of amorphous metal alloy 10 to form scribe line 14.

We have discovered that a functional relationship exists between downward force 36 and a cutting edge radius 38. That is, as cutting edge radius 38 becomes greater with wear, more downward force 36 must be applied in order to obtain a satisfactory scribe line 14 for producing the slitting action. When cutting edge 34 is freshly sharpened, giving a cutting edge radius 38 which may be unmeasurably small, a very small value of downward force 36 is sufficient to produce a satisfactory scribe line 14. Using a tungsten carbide wheel 26 having a diameter of 35 mm, for example, a downward force 36 of about 9 Newtons is effective to produce a satisfactory scribe line 14 with a freshly sharpened cutting edge 34 in a strip of amorphous metal alloy 10 having a thickness of about 0.025 mm. The value of downward force 36 required increases with increasing cutting edge radius 38 to a value of downward force 36 of about 110 Newtons, at which time cutting edge radius 38 has degraded to slightly less than about 0.038 mm. A satisfactory range of values for downward force 36 may be from about 50 to about 100 Newtons to provide satisfactory scribing in a production environment. When cutting edge radius 38 further degrades beyond a value of about 0.038 mm, a satisfactory scribe line 14 cannot be made regardless of the value of downward force 36 applied. When cutting edge radius 38 wears beyond this value, sharpening or replacement is required. It should be noted that the limiting value of cutting edge radius 38 beyond which a satisfactory scribe line 14 cannot be produced is approximately equal to about 1.5 times the thickness of strip of amorphous metal alloy 10. This may be a satisfactory approximation for a relationship between a limiting value for cutting edge radius 38 and a thickness of strip of amorphous metal alloy 10 over a reasonable range of thicknesses of strip of amorphous metal alloy 10.

Referring now to FIG. 6, once a satisfactory scribe line 14 has been formed, part 16 and part 18 are folded toward each other by any convenient means with scribe line 14 inside. Scribe line 14 defines the fold so that strip of amorphous metal alloy 10 tends to fold accurately along it. We have discovered that attempting to fold strip of amorphous metal alloy 10 with scribe line 14 on the outside at this stage is not satisfactory since the fold does not tend to follow scribe line 14. Strip of amorphous metal alloy 10 is then creased along the fold by moving parts 16 and 18 toward each other to an effective degree of closeness at least in the vicinity of scribe line 14.

The folding and creasing may be performed by a conventional bending brake which folds one side against the other in a single motion or a pair of spaced-apart stationary or rotating mandrels used between which strip of amorphous metal alloy 10 is drawn. In this latter method, which is, in fact, the preferred embodiment of the method, folding is performed as strip of amorphous metal alloy 10 passes from wheel-type scribing tool 24 to the mandrels and the creasing occurs at a single point on strip of amorphous metal alloy 10 as that point passes the mandrels. Referring now also to FIG. 7, a pair of mandrels 40 and 42 are shown spaced apart and moving parts 16 and 18 of strip of amorphous metal alloy 10 toward each other along scribe line 14, and nearly into face-to-face contact, as strip of amorphous metal alloy 10 is drawn between them. In the most preferred embodiment, mandrels 40 and 42 are a pair of opposed rotatable rollers. It is also possible to satisfactorily perform the folding operation manually using only the fingers.

We have discovered that part 16 and part 18 need not be moved together into face-to-face contact with each other for successful performance of the method. In fact, permitting face-to-face contact between part 16 and part 18 as strip of amorphous metal alloy 10 passes between mandrels 40 and 42 causes binding which prevents part 16 and part 18 from adjusting themselves in the direction of motion. This can tend to force the crease off the cutting line defined by scribe line 14. Thus, a spacing is preferably established between mandrels 40 and 42 which permits a space 44 to exist between facing surfaces of part 16 and part 18. Although an optimum value of space 44 may vary for different alloys and thicknesses of strip of amorphous metal alloy 10, for a thickness of about 0.038 mm with the alloy previously defined, we have discovered that a spacing between mandrels 40 and 42 of about three times the thickness of strip of amorphous metal alloy 10, or about 0.075 mm, is satisfactory. This allows space 44 to assume a value about equal to the thickness of strip of amorphous metal alloy 10.

Referring now to FIG. 8, after strip of amorphous metal alloy 10 is folded as hereinabove described, the crease is at least partly flattened out. As part 16 and part 18 move apart in the vicinity of the crease, strip of amorphous metal alloy 10 separates cleanly along scribe line 14 to provide two separate strips. Flattening can be performed in any convenient manner, but in the preferred embodiment, strip of amorphous metal alloy 10 is flattened at one end and then progressively flattened toward the other end as shown. The amount of flattening required varies with the sharpness of cutting edge radius 38. With a freshly sharpened cutting edge 34, parts 16 and 18 separate well before the crease is fully flattened out. As cutting edge 34 becomes duller, more and more flattening is required before separation occurs. To extend the life of wheel 26, it may be desirable not only to fully flatten the crease, but also, to at least partly reverse the crease. Such reversal may include, for example, moving parts 16 and 18 together with scribe line 14 on the outside defining the apex of a reverse fold. In an extreme case, parts 16 and 18 may be passed between a further pair of mandrels (not shown) which would complete the reversal by bringing the former outside surfaces of parts 16 and 18 closer together at least in the vicinity of scribe line 14.

It should be noted that the progressive flattening illustrated in FIG. 8 is not in any way similar to the creasing and tearing process commonly used to separate a piece of paper and the like into two pieces. An attempt to tear strip of amorphous metal alloy 10 along creased scribe line 14 in this way produces irregular, and even a serrated, edges instead of the clean, flat edges produced by the method of the present invention.

When parts 16 and 18 separate from each other, separated edges 46 and 48 are preferably moved away from each other so that mechanical interlocking of edges 46 and 48 is avoided. When the scoring, folding, creasing, flattening, and separating are performed according to the present disclosure, edges 46 and 48 are clean without burrs, bumps or other artifacts of the slitting operation which would be detrimental to the space factor of a core wound from the separated strips.

The flattening and separating alluded to in the preceding paragraph can be performed manually. In one manual separation technique, parts 16 and 18 are pulled laterally away from each other substantially as shown in FIG. 8 starting at one end and moving progressively to the other. When the length to be cut is relatively short such as, for example, when cutting across strip of amorphous metal alloy 10, we have discovered that it is only necessary to pull outward uniformly on the outer edges of parts 16 and 18. When an amount of pulling force is reached which is enough to sufficiently flatten the fold, the parts separate all along their lengths at substantially the same time in an almost explosive separation. An examination of the newly separated edges produced by this method shows that the same excellent edge cleanness is achieved as with the other flattening techniques.

Figure 9:
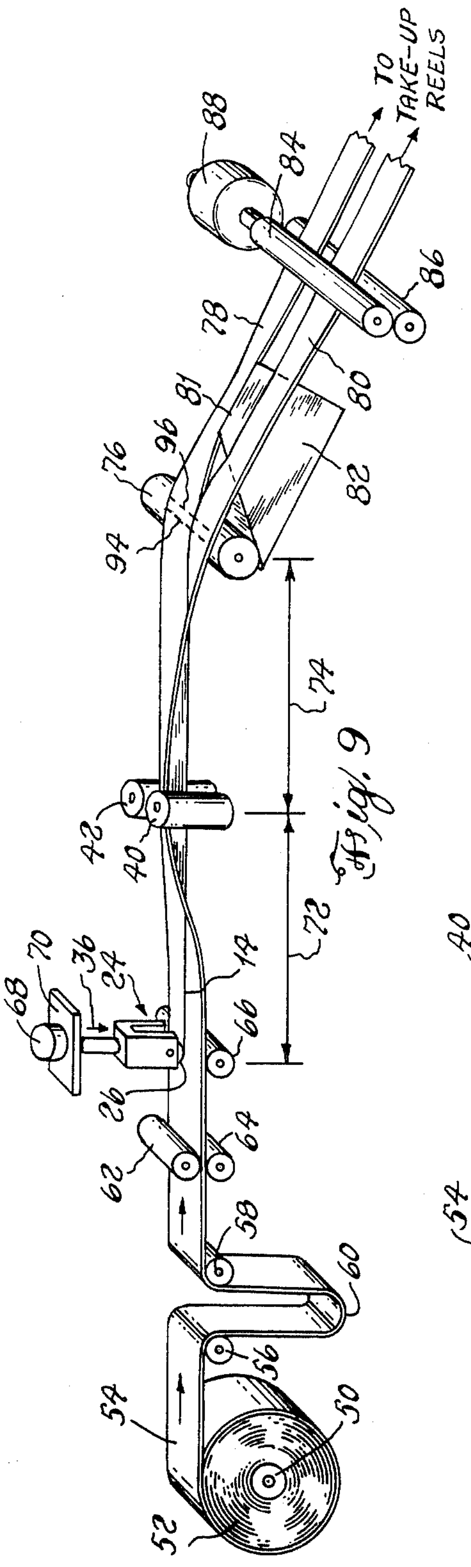
FIG. 9 is a simplified schematic diagram of a slitting apparatus according to an embodiment of the invention.

One suitable apparatus for performing the scribing, folding, creasing, flattening and separating is shown in FIG. 9. A spool 50 holds a roll 52 of amorphous metal alloy 54 which is paid out under control of conventional feeding apparatus which may include, for example, first and second idler rolls 56 and 58 for forming a feed loop 60. Conventional sensing and control devices (not shown) may be employed to control the length of feed loop 60 in order to ensure a reliable supply of amorphous metal alloy 54 for subsequent operations.

A braking device which may be, for example, a pair of braking rollers 62 and 64, apply a predetermined braking force to amorphous metal alloy 54 passing between them. Braking rollers 62 and 64 may be of any conventional type such as, for example, a magnetic particle brake. Wheel-type scribing tool 24 is disposed on a first side of amorphous metal alloy 54. A back-up roll 66 is disposed on the opposite side of amorphous metal alloy 54. Wheel-type scribing tool 24 produces scribe line 14 on the upper surface of amorphous metal alloy 54 in FIG. 9.

Although any convenient means may be employed for producing downward force 36 (see FIG. 5), one embodiment illustrated in FIG. 9 includes a replaceable weight 68 which may be placed on, for example, a platform 70. As the radius of the cutting edge of wheel 26 increases with use, the mass of replaceable weight 68 may be increased as previously described until, when the radius of the cutting edge increases to the point where a satisfactory scribe line 14 can no longer be performed, a freshly sharpened wheel-type scribing tool 24 must be substituted for the wheel-type scribing tool 24 in use and the mass of replaceable weight 68 reduced appropriately to begin a further sequence of use.

One skilled in the art would recognize that other appropriate devices would be satisfactory for maintaining a desired value of downward force 36 on wheel-type scribing tool 24 without departing from the scope of the invention. Resilient means such as, for example, a spring (not shown) may be substituted for replaceable weight 68 to produce downward force 36. We have observed that, as the cutting edge radius of wheel-type scribing tool 24 increases with wear, the width of scribe line 14 also increases. Thus, the width of scribe line 14 may be employed as an indicator of the required value of downward force 36.

More precise and responsive control of downward force 36 may be obtained using a feedback control system (not shown) which dynamically adjusts the value of downward force 36 according to the width of scribe line 14. In such a feedback control system, the width of scribe line 14 is measured using conventional apparatus such as, for example, a photo-optical sensor. The width is then employed to derive, or look up, a required value of downward force 36 using, for example, a lookup table, and this value of downward force 36 is applied to wheel-type scribing tool 24 using, for example, a conventional mechanical or hydraulic force actuator. Although we consider that measuring the width of scribe line 14 and using the measurement to establish a corresponding value of downward force 36 is an inventive part of the present disclosure, the apparatus required for measuring the width of scribe line 14 and for transducing such width into a corresponding value of downward force 36 is well known and is therefore not further shown or described herein.

After passing wheel-type scribing tool 24, amorphous metal alloy 54 is folded as it moves toward mandrels 40 and 42 where a crease is formed along the line defined by scribe line 14. An along-stream spacing 72 between wheel-type scribing tool 24 and mandrels 40 and 42 is sufficient to permit the edges of amorphous metal alloy 54 to curve upward without excessively lifting the edges alongside wheel 26 of wheel-type scribing tool 24. In the absence of constraints on amorphous metal alloy 54 between wheel-type scribing tool 24 and mandrels 40 and 42, the required value of spacing 72 varies with the width of amorphous metal alloy 54. A minimum value of spacing 72 is about two or three times a width of amorphous metal alloy 54. A maximum value is established by the dimensions of the facility in which the slitting operation is being performed. For practical purposes, a value of spacing 72 of about ten times a width of amorphous metal alloy 54 is more than adequate.

Figure 10:
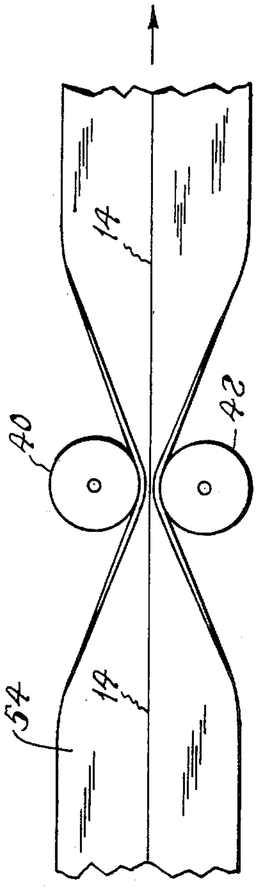
FIG. 10 is an enlarged top view of a strip of amorphous alloy passing between a pair of cylindrical mandrels.

Mandrels 40 and 42 are illustrated as a pair of spaced-apart rollers. We have discovered that, due to the relatively wide spacing of mandrels 40 and 42, that is, a spacing of about three times the material thickness of amorphous metal alloy 54, the contact forces between amorphous metal alloy 54 and mandrels 40 and 42 are so light that, even when rollers are employed, they seldom, if ever, are rotated by the passage of amorphous metal alloy 54 therebetween. Referring now to FIG. 10, the mandrels 40 and 42 of the embodiment of the invention illustrated in FIG. 9 is shown. Since the contact forces, and consequently the wear, on mandrels 40 and 42 are so light, the cost and complexity of providing rotatable mandrels 40 and 42 may not be warranted.

Figure 11:
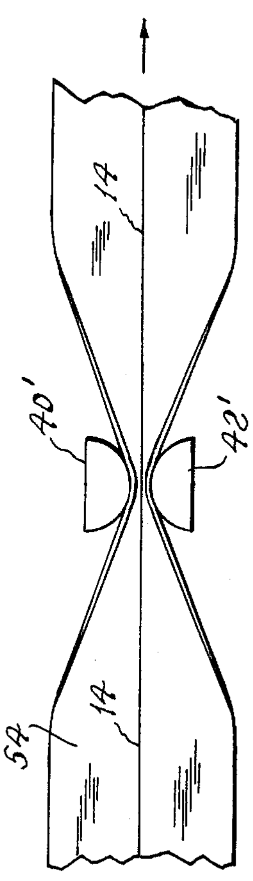
FIG. 11 is an enlarged top view of a strip of amorphous alloy passing between a pair of stationary semi-cylindrical mandrels.

Referring to FIG. 11, a stationary, non-rotating embodiment of mandrels 40' and 42' is shown which is effective for producing the crease along scribe line 14 in amorphous metal alloy 54.

Referring again to FIG. 9, after being creased in mandrels 40 and 42, amorphous metal alloy 54 passes along a downstream spacing 74 and then over a flattening roller 76. A suitable combination of contact angle of amorphous metal alloy 54 with flattening roller 76 and a tension in amorphous metal alloy 54 causes amorphous metal alloy 54 to flatten in the transverse direction just as it makes contact with flattening roller 76. At some point before, during or after its contact with flattening roller 76, amorphous metal alloy 54 splits to form first and second part strips 78 and 80. Part strips 78 and 80 pass on opposite sides of a vertex 81 of a pyramidal prism 82 which tends to move the newly separated edges of part strips 78 and 80 apart and to thereby avoid mechanical keying together of the newly separated edges. In addition to preventing unwanted mechanical keying of newly separated edges, pyramidal prism 82 at least partly reverses the fold after strip of amorphous alloy 54 loses contact with flattening roller 76. The partial reversal of the crease may be useful in achieving separation under certain condition, particularly of the combination of the sharpness of cutting wheel 26 and the value of downward force 36.

A drive roller 84 and a pinch roller 86, on opposed sides of part strips 78 and 80, cooperate to pull amorphous metal alloy 54 through the slitting apparatus as hereinabove described. A tension drive motor 88 applies a torque to drive roller 84 which is effective to apply a predetermined tension to amorphous metal alloy 54. After being tensioned and pulled through the slitting apparatus by drive roller 84 and pinch roller 86, part strips 78 and 80 pass on to conventional take-up reels (not shown).

The illustration in FIG. 9 is highly schematic and simplified in order to support a clear and complete disclosure of the elements which we consider to comprise our invention. One skilled in the art would recognize that additional conventional components would be desirable in a practical machine. For example, a conventional device (not shown) for measuring tension in amorphous metal alloy 54 is preferrably included to permit dynamic control of tension drive motor 88 in order to maintain the tension in amorphous metal alloy 54 at the predetermined value. Alternatively, tension drive motor 88 may be manually controlled to produce a tension in amorphous metal alloy 54 which satisfies empirical parameters to be explained hereinafter.

Figure 12:
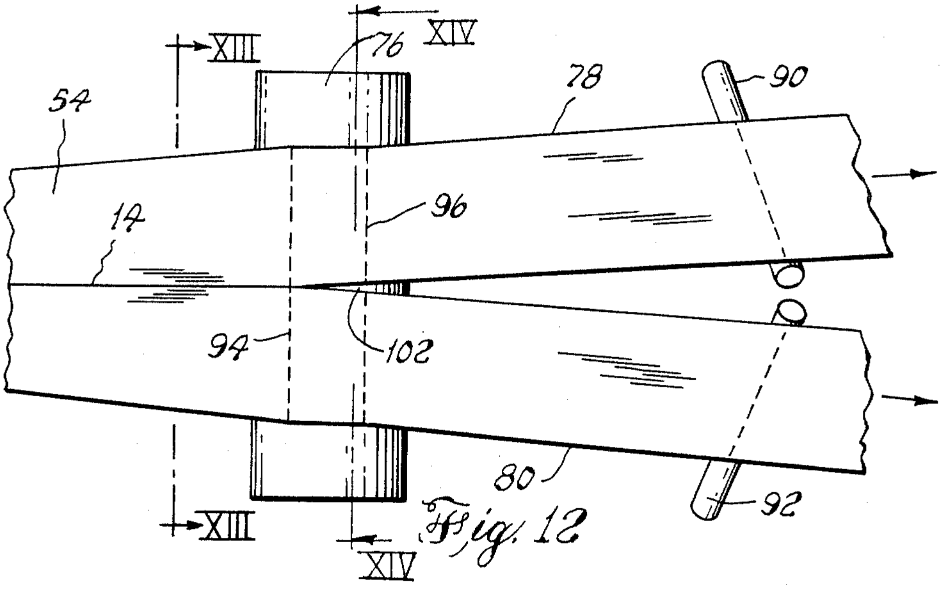
FIG. 12 is a close-up top view of a strip of amorphous alloy being flattened and separated.

The positioning and shape of pyramidal prism 82 is established to produce an amount of separating force on amorphous metal alloy 54 and a partial reversal of the fold acting at about the location where amorphous metal alloy 54 moves out of contact with flattening roller 76 effective to move part strips 78 and 80 apart without applying so little separating force that poor edge quality is produced or so much that the edges of part strips 78 and 80 become distorted. The use of pyramidal prism 82 has the advantage of simplicity since pyramidal prism 82 is a purely passive component interposed in the path of part strips 78 and 80. One skilled in the art would recognize, however, that other devices may be used to perform this function. Referring to FIG. 12, an embodiment of the invention is shown in which pyramidal prism 82 of FIG. 9 is replaced with first and second angled separation rollers 90 and 92. Angled separation rollers 90 and 92 may be stationary or rotatable and, if rotatable, may be passive or driven.

The separating force and partial fold reversal produced by angled separation rollers 90 and 92 (or pyramidal prism 82) is combined with the tension in amorphous metal alloy 54 and the sharpness and downward force on wheel 26 to produce clean slit edges. The point at which separation occurs can vary from upstream of flattening roller 76, particularly when wheel 26 is freshly sharpened, a point in contact with flattening roller 76 or a point downstream of flattening roller 76. It is even possible that separation may even take place downstream of angled separation rollers 90 and 92.

The most stable operation of the apparatus is achieved when the parameters are adjusted so that separation takes place just before, during or after amorphous metal alloy 54 first contacts flattening roller 76.

Figure 13:
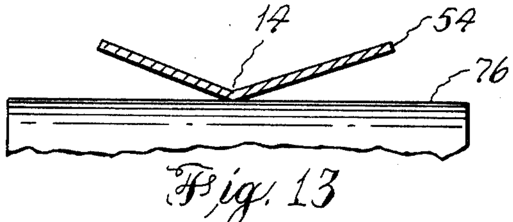
FIG. 13 is a cross section taken along XIII—XIII in FIG. 12.
Figure 14:
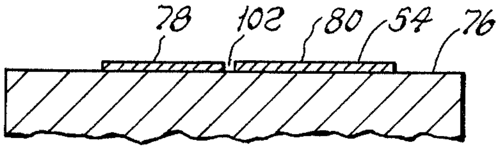
FIG. 14 is a cross section taken along XIV—XIV in FIG. 12.

The sequence of cross sections in FIGS. 13 and 14 show the empirical result of the correct combination of the tension and separating-force parameters. Amorphous metal alloy 54 first contacts flattening roller 76 along a line indicated by a dashed line 94 in FIG. 12, remains in contact with flattening roller 76 over a portion of the rotational angle of flattening roller 76 and then moves out of contact with flattening roller 76 at a second dashed line 96. Just before reaching dashed line 94, amorphous metal alloy 54 is only partially flattened as shown in FIG. 13. Referring now to FIG. 14, just as amorphous metal alloy 54 contacts flattening roller 76 at dashed line 94 it becomes substantially flattened against flattening roller 76 thus straightening out the crease previously existing about scribe line 14. When the correct values of tension and separating force are applied, just at the point indicated in FIG. 14, a clean slit 102 starts and remains stable in this position whereby clean separation of amorphous metal alloy 54 into two part strips 78 and 80 is attained.

Figure 15:
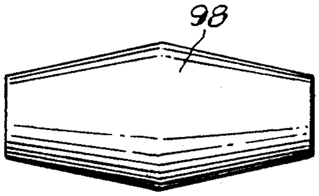
FIG. 15 is a side view of a spindle-shaped crowned roller according to an embodiment of the invention.

Although the present description employs the surface of a rotatable flattening roller 76 against which amorphous metal alloy 54 is flattened, other types of flattening surfaces are equally within the contemplation of the invention. For example, flattening roller 76 may be replaced with a suitably shaped stationary surface (not show) against which amorphous metal alloy may be flattened in a manner completely analogous to the above detailed description. In accordance with a further embodiment of the invention, the functions of flattening roller 76 and angled separation rollers 90 and 92 (or pyramidal prism) may both be performed by a spindle-shaped crowned roller 98 such as shown in FIG. 15.

In addition to the tension and separation-force parameters recited in the preceding, a certain amount of interaction exists between these parameters and the keenness of cutting edge 34 and the value of downward force 36 employed in forming scribe line 14. However, with the disclosure given in the preceding, one skilled in the art would require no experimentation to make and use the slitting apparatus of the present invention.

Figure 16:
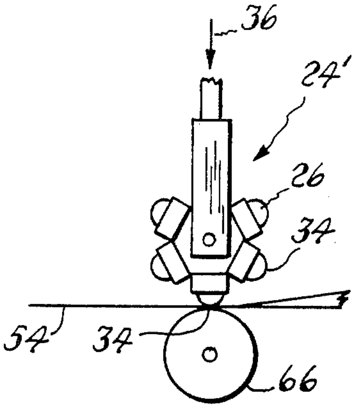
FIG. 16 is a side view of a turret-type wheel-type slitting tool suitable for use in one embodiment of the invention.

Referring now to FIG. 16, there is shown an improved wheel-type scribing tool 24' which may be employed in the present invention. In order to permit longer slitting runs, the single wheel-type scribing tool 24 of FIG. 9 is replaced by multiple wheel-type scribing tools 24' in a turret arrangement so that, upon one cutting edge 34 becoming dull or damaged, a new cutting edge 34 can be swivelled into place without loss of running time of the apparatus.

Another possibility for extending the run time for a cutting edge 34 includes continuous sharpening of cutting edge 34 while it is in use. A diamond-impregnated sharpening wheel (not shown) may be urged against wheel 26 and optionally rotated to maintain cutting edge 34 in satisfactorily sharp condition for an extended cutting run.

Figure 17A:
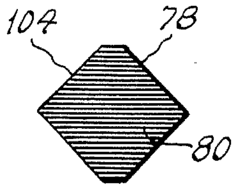
FIG. 17A is a cross section of one shape of magnetic core which may be wound from a strip of amorphous metal alloy slit by the apparatus of the present invention.
Figure 17B:
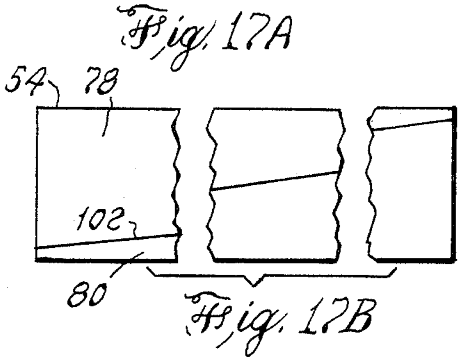
FIG. 17B is a foreshortened top view of a strip of amorphous metal alloy slit diagonally to form the magnetic core of FIG. 17A.

As previously noted, one reason for slitting amorphous metal alloy 54 is to obtain a separated shape which, when wound on a mandrel provides a cross section which conforms more closely to the shape of a wire coil wound around it than is possible if only square or rectangular cross sections were available. One possibility is shown in FIGS. 17A and 17B wherein the length dimension is greatly foreshortened for purposes of illustration. Amorphous metal alloy 54 is separated by a single diagonal slit 102 into two triangular part strips 78 and 80. Each of part strips 78 and 80 may be wound on a mandrel (not shown) to produce a core with a triangular cross section or they may be wound end-to-end as shown in FIG. 17A to produce a core 104 with a square cross section and with the laminations of the core running in the direction of the cross hatching.

Figure 18A:
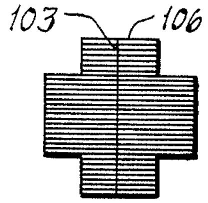
FIG. 18A is a cruciform cross section of a magnetic core which may be wound using a strip of amorphous metal alloy slit by the apparatus of the present invention.
Figure 18B:
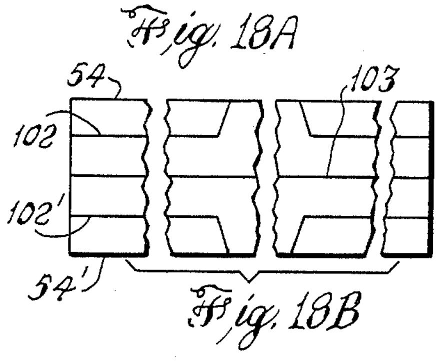
FIG. 18B is a foreshortened top view of a strip of amorphous metal alloy slit in step-wise fashion to form the cruciform magnetic core of FIG. 18A.

The single diagonal slit 102 of FIG. 17B has the advantage that all of the slit material is usable. Since the cost of amorphous metal alloy 54 is currently quite high, normal applications may not support the cost of a core whose production requires a substantial scrap rate of the material. Certain applications which are cost inelastic may warrant the improved cross-sectional shape afforded by the slitting patterns of FIGS. 18A, 18B, 19*a* and 19B at the expense of a substantial scrap rate. In the embodiment shown in FIGS. 18A and 18B, a stepped slit 102 along one edge of amorphous metal alloy 54 and a corresponding stepped slit 102' along an opposite edge of a second amorphous metal alloy 54' produce two strips which, when wound on a mandrel with their uncut edges 103 in abutment, produce a core 106 having a cruciform or any other suitable stepped cross section. The slitting technique of FIGS. 18A and 18B can reproduce substantially any desired polygonal cross section.

Figure 19A:
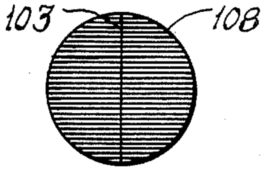
FIG. 19A is a round cross section of a magnetic core which may be wound using a strip of amorphous metal alloy slit by the apparatus of the present invention.
Figure 19B:
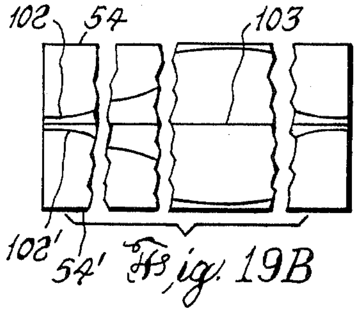
FIG. 19B is a foreshortened top view of a strip of amorphous metal alloy slit in sinusoidal fashion to form the round cross section magnetic core of FIG. 19A.

Referring now to FIGS. 19A and 19B, a slitting pattern is shown which can produce a substantially round core 108. Slits 102 and 102' on opposed sides of amorphous metal alloys 54 and 54' follow a long sinusoidal path which, when amorphous metal alloys 54 and 54' are wound on a mandrel with their uncut edges 103 in abutment, produce a round or ovate core 108.

The slitting patterns and resulting core shapes described in the preceding should be taken as exemplary only and not as an exhaustive set of the possibilities. The present invention provides sufficient flexibility to create a finished strip from which virtually any desired core cross-sectional shape can be wound.

Figure 20:
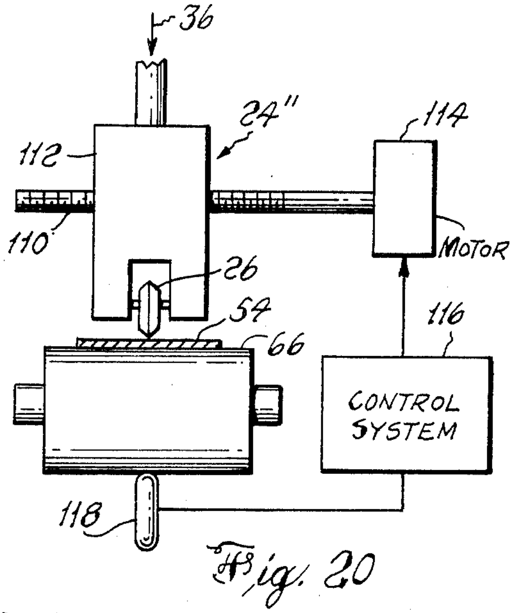
FIG. 20 is an end view showing apparatus for controlling the transverse position of the scribing tool of FIG. 9 whereby the slit shapes of FIGS. 17A–19B may be produced.

Since the length of amorphous metal alloy 54 may be measured in miles and the width in, at most a few inches, controlling the transverse position of slit 102 to produce the desired core cross section is not a trivial task. Referring now to FIG. 20, there is shown one embodiment of an apparatus which may be used to control the side-to-side movement of a wheel-type scribing tool 24". A lead screw 110 is threaded into a body 112 of wheel-type scribing tool 24". Lead screw 110 is rotated by a scriber drive motor 114 which is responsive to control signals from a control system 116 to thereby drive wheel 26 transversely across amorphous metal alloy 54 and to thereby produce the desired shape of scribe line 14 which results in a corresponding shape of slit 102. A sensing wheel 118 contacts a peripheral surface of back-up roll 66 as shown, or alternately, contacts a surface of amorphous metal alloy 54 to produce a length signal responsive to the passage of amorphous metal alloy 54 through the apparatus. The length signal is applied to control system 116 wherein it is translated into a command for application to scriber drive motor 114. At its simplest, control system 116 may be a conventional pulse generator which produces a single pulse each time sensing wheel 118 senses the passage of a predetermined length of amorphous metal alloy 54. Scriber drive motor 114 may be a stepping motor which responds to each pulse from control system 116 with a small unidirectional rotational step which, in turn, produces a small unidirectional translational step of wheel-type scribing tool 24". Such a simple embodiment is satisfactory for producing the diagonal slit of FIGS. 17A and 17B. For more complex slitting patterns, control system 116 may contain a length-to-width lookup table using, for example, a microprocessor, for providing bi-directional drive signals to scriber drive motor 114. Since the hardware for implementing a lookup table and for producing a bi-directional drive signal in response thereto is well known in the art, further description thereof is omitted.

It would be clear to one skilled in the art that an equivalent apparatus to that described in the preceding includes one in which wheel-type scribing tool 24" remains stationary while amorphous metal alloy 54 is moved transversely by the equivalent of control system 116.

Due to the gradualness with which wheel-type scribing tool 24" is translated across the width of amorphous metal alloy 54 compared to the relatively great length of amorphous metal alloy 54 passing between steps, no difficulty may be encountered in maintaining desired tracking of cutting edge 34 along the desired cutting line 12. If a tendency develops for the lateral translation of wheel-type scribing tool 24' to physically shift amorphous metal alloy 54 sideways rather than to move scribe line 14 with respect to the edges of amorphous metal alloy 54, a slight trailing-arm caster (not shown) may be added to wheel-type scribing tool 24" to aid in permitting scribe line 14 to track the desired cutting line 12.

Figure 21:
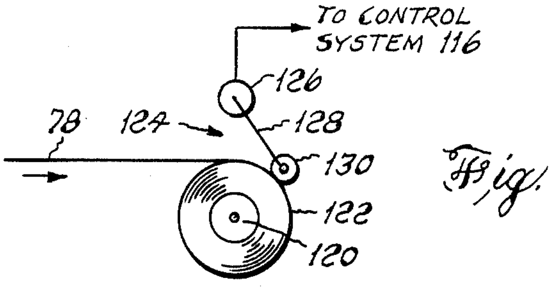
FIG. 21 is a schematic diagram of a further apparatus for controlling the transverse position of the scribing tool.

The thickness of amorphous metal strips made by current processes is variable. Due to the great number of layers which must be built up of such thin material, the variability in thickness can translate into a substantial variation in core shape and magnetic properties if only the length of amorphous metal alloy 54 passing wheel-type scribing tool 24" is used as an input to control system 116 for controlling the transverse position of wheel-type scribing tool 24". A preferred technique is illustrated in FIG. 21 wherein half strip 78, instead of being wound on a take-up reel, instead is wound directly on a mandrel 120 for forming a core 112 as the slitting operation is being performed. A sensing device 124 senses the thickness or build of core 122 as it is being wound and transmits a signal representing this value to control system 116. Control system 116 employs the existing build of core 122 in setting a transverse position of wheel-type scribing tool 24" in the manner previously explained.

Sensing device 124 may be of any convenient type such as, for example, electromechanical, electromagnetic or electrooptical. For purposes of concreteness, sensing device 124 is shown to include a variable resistor 126 whose resistance is varied by an actuating arm 128 connected to an idler roller 130 which is resiliently urged to contact a surface of core 122.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What we claim is:

1. Apparatus for slitting a strip of amorphous metal comprising:
(a) means for scribing a line in a first surface of said strip;
(b) means for folding the parts of said strip located on opposite sides of said scribed line toward each other along said line to form a folded strip having said line within the fold;
(c) means for moving said parts during said folding into near face-to-face contact and sufficiently close together adjacent said line to form a crease; and
(d) means for at least partly flattening said crease whereby said strip separates into first and second strips on opposed sides of said line.

2. Apparatus according to claim 1 wherein said means for at least partly flattening includes means for unfolding a creased portion of said strip to a generally flattened condition.

3. Apparatus according to claim 2 wherein said means for at least partly flattening includes means for at least partly reversing said crease.

4. Apparatus according to claim 1 wherein said means for scribing includes a wheel-type scribing tool, said wheel-type scribing tool including a rotatable wheel having a cutting edge on a peripheral surface thereof.

5. Apparatus according to claim 4 wherein said means for scribing includes means for applying a scribing force to said wheel-type scribing tool effective for urging said cutting edge toward said strip with a predetermined force.

6. Apparatus according to claim 5 wherein said means for applying a scribing force includes means for applying a variable scribing force according to a sharpness of said cutting edge.

7. Apparatus according to claim 6 wherein said means for applying a variable scribing force include (a) two replaceable weights of different mass, either of which can be used in said apparatus for developing a downward force dependent on the mass of weight used, and (b) means for transmitting said downward force to said wheel-type cutting tool for supplying at least part of said scribing force.

8. Apparatus according to claim 4 wherein said wheel-type scribing tool includes a plurality of wheels each including a cutting edge and means for selectively applying a cutting edge of one said wheels to said strip.

9. Apparatus according to claim 1 wherein said means for scribing a line includes means for transporting said strip in a lengthwise direction past said means for scribing a line and said means for scribing a line includes a scribing tool effective for contacting a surface of said strip and for scribing a line in said surface as said strip is transported therepast, said means for scribing a line further including means for transversely moving said scribing tool relative to said strip whereby a transverse position of said line on said strip is changed.

10. Apparatus according to claim 9 wherein said means for transversely moving includes a transverse lead screw engaging said scribing tool and means for systematically driving said lead screw.

11. Apparatus according to claim 10 wherein said means for systematically driving said lead screw includes means for measuring a passage of said strip past said scribing tool and means responsive thereto for producing a control signal, said means for systematically driving including a scriber drive motor, said scriber drive motor being responsive to said control signal for driving said lead screw.

12. Apparatus according to claim 11 wherein said means for producing a control signal includes means for generating a pulse in response to the passage of a predetermined length of said strip past said scribing tool, said scriber drive motor being a stepping motor responsive to each pulse for producing a predetermined increment of motion of said lead screw and a related motion of said scribing tool.

13. Apparatus according to claim 11 wherein said means for producing a control signal includes means for generating a pulse in response to the passage of a predetermined length of said strip past said scribing tool, said scriber drive motor being a stepping motor responsive to each pulse for producing a predetermined increment of motion of said lead screw and a related motion of said scribing tool.

14. Apparatus according to claim 10 wherein said means for systematically driving said lead screw includes means for measuring a build of a core being wound from one of said first and second strips and means responsive thereto for producing a control signal, said means for systematically driving including a scriber drive motor, said scriber drive motor being responsive to said control signal for driving said lead screw.

15. Apparatus according to claim 9 wherein said means for transversely moving one of said scribing tool and said strip includes means for systematically varying a transverse position of said scribing tool with respect to said strip as a function of a build of a core being wound from one of said first and second strips.

16. Apparatus according to claim 15 wherein said means for systematically varying includes means for measuring a build of a core being wound from one of said first and second strips and means for transversely moving one of said scribing tool and said strip in response to said means for measuring.

17. Apparatus according to claim 9 wherein said means for transversely moving said scribing tool relative to said strip includes means for systematically varying a transverse position of said scribing tool with respect to said strip as a function of a length of said strip passing said scribing tool.

18. Apparatus according to claim 17 wherein said means for systematically varying includes means for measuring a length of said strip passing said scribing tool and means for transversely moving said scribing tool relative to said strip in response to said means for measuring.

19. Apparatus according to claim 1 wherein said means for moving said parts of said strip sufficiently close together includes first and second mandrels having first and second facing surfaces for engaging said strip on the strip surface opposite to that of said first strip surface, said first and second mandrel surfaces being spaced a first predetermined distance apart and disposed a second predetermined distance downstream of said means for scribing a line, said first predetermined distance being effective, when said strip is drawn between said first and second mandrels to form said crease.

20. Apparatus according to claim 19 wherein said first predetermined distance exceeds twice a thickness of said strip whereby facing surfaces of said strip do not bind against each other while said strip is drawn between said first and second mandrels, said first predetermined distance being small enough to form a crease which, when flattened by said means for flattening is effective to produce separation of said strip into said first and second strips.

21. Apparatus according to claim 20 wherein said second predetermined distance is at least twice a width of said strip.

22. Apparatus according to claim 19 wherein said first predetermined distance is about three times a thickness of said strip.

23. Apparatus according to claim 19 wherein said first and second mandrels are effective for folding said parts of said strip while said strip is drawn from said means for scribing a line to said first and second mandrels.

24. Apparatus according to claim 1 wherein said means for flattening includes a flattening surface downstream of said means for moving said said parts sufficiently close and means for producing a predetermined tension in said strip lengthwise thereof, said

25. Apparatus according to claim 24 further comprising means for moving apart newly separated edges of said first and second strips.

26. Apparatus according to claim 25 wherein said means for moving apart includes a prism having a vertex disposed between said newly separated edges downstream of said means for flattening.

27. Apparatus according to claim 26 wherein said prism includes a pyramidal prism.

28. Apparatus according to claim 25 wherein said means for moving apart includes first and second angled separation rollers contacting said first and second strips.

29. Apparatus according to claim 24 wherein said flattening surface includes a peripheral surface of a rotatable flattening roller, said strip contacting said peripheral surface over a substantial angular portion of said peripheral surface, said tension being effective for producing said flattening against said peripheral surface.

30. Apparatus according to claim 29 wherein said rotatable flattening roller includes a cylindrical roller.

31. Apparatus according to claim 29 wherein said rotatable flattening roller includes a crown in a peripheral surface thereof.

32. Apparatus according to claim 29 wherein said rotatable flattening roller includes a spindle-shaped flattening roller.

33. Apparatus according to claim 24 wherein said means for producing a predetermined tension includes opposed drive and pinch rollers disposed on opposite sides of said first and second strips downstream of said flattening surface and means for driving at least said drive roller.

34. Apparatus according to claim 33 wherein said means for driving said tension roller includes a tension drive roller.

35. Apparatus for slitting a strip of amorphous metal comprising:

means for transporting said strip in a direction;

said means for transporting including means for producing a predetermined tension in said strip lengthwise thereof;

a wheel-type scribing tool of the type including a wheel having a cutting edge thereon, said cutting edge including a cutting edge radius;

means for contacting said cutting edge on a first surface of said strip of amorphous metal;

a backup surface contacting a second surface of said strip opposing said wheel-type scribing tool;

said means for contacting being effective for applying a predetermined scribing force to said cutting edge;

said cutting edge radius and said predetermined force being jointly effective for scribing a scribed line in said first surface as said strip is transported therepast, thereby defining two parts of said strip on opposite sides of said scribed line;

first and second mandrels having first and second facing surfaces spaced a first predetermined distance apart for engaging said second surface of said strip and disposed a second predetermined distance downstream of said wheel-type scribing tool;

said second predetermined distance being effective to permit said strip to fold about said scribed line for entry between said first and second facing surfaces and said first predetermined distance being effective during folding to move said parts into near face-to-face contact and to crease said strip about said scribed line;

a flattening surface downstream of said first and second mandrels, said flattening surface being disposed for contacting said second surface of said strip, said predetermined tension being effective for flattening said crease against said flattening surface;

means downstream of said flattening surface for separating newly separated edges of said strip;

at least two of the following: said cutting edge radius, said predetermined scribing force, said first predetermined distance, said predetermined tension, and said means for separating, being jointly effective for producing a slit in said strip as it leaves said flattening surface.

36. Apparatus according to claim 35 wherein said cutting edge radius is less than a thickness of said strip.

37. Apparatus according to claim 35 wherein said cutting edge radius and said predetermined scribing force are related.

38. Apparatus according to claim 37 wherein said predetermined scribing force increases with an increase in said cutting edge radius.

39. Apparatus according to claim 38 wherein said scribing force is from about 5 to about 110 Newtons and said cutting edge radius is less than about 0.038 mm.

40. A method for producing a magnetic core comprising;

(a) scribing a line in a first surface of a strip of amorphous metal;

(b) folding the parts of said strip on opposite sides of said scribed line toward each other along said line to form a folded strip having said line within the fold;

(c) moving said parts during said folding into near face-to-face contact and sufficiently close together adjacent said line to form a crease; and (d) at least partly flattening said crease whereby said strip separates into first and second strips on opposed sides of said line; and (e) winding at least one of said first and second strips to form said magnetic core.

41. Apparatus for producing a magnetic core comprising the apparatus of claim 1 in combination with means for winding at least one of said first and second strips to form said magnetic core.

* * * * *